Aug. 8, 1944.  O. E. MILLER  2,355,229
ROD WEEDER
Filed Oct. 19, 1939
Fig. 1.
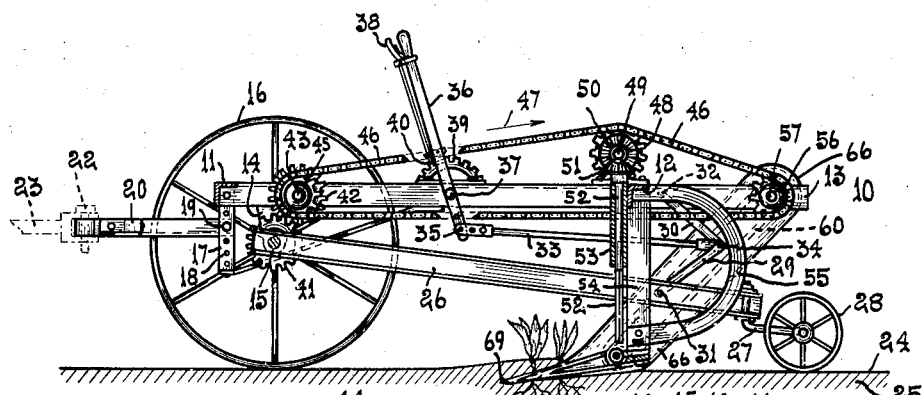
Fig. 2.
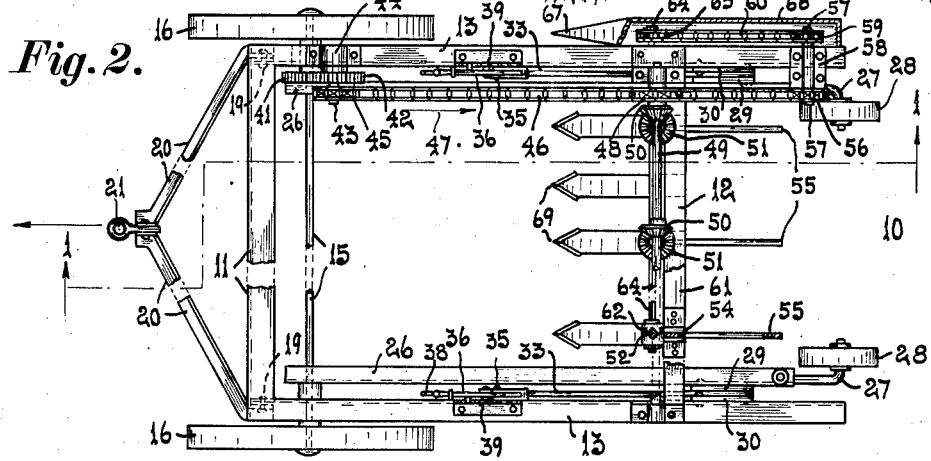
Fig. 3.
Fig. 4.
Fig. 5.
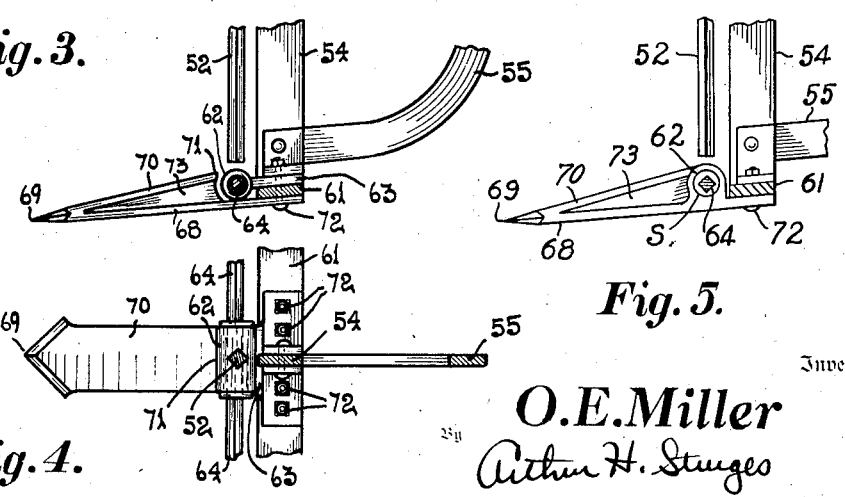
Inventor
O. E. Miller
Arthur H. Sturges
Attorney Patented Aug. 8, 1944

2,355,229

UNITED STATES PATENT OFFICE 2,355,229

ROD WEEDER

Oscar E. Miller, Stratton, Nebr., assignor to Cheney Weeder Company, Cheney, Wash., a corporation of Washington Application October 19, 1939, Serial No. 300,180

1 Claim. (Cl. 97—42)

This invention relates to agricultural implements and more particularly to devices for removing weed growths from agricultural land and has for an object to provide a machine of economical construction which is certain of operation in the removal of weeds and the like from fields more efficiently and economically than heretofore.

Another object of the invention is to provide plow points of a particular construction which are adapted to be assembled with a rod weeder mechanism of any conventional type or with the particular mechanism disclosed herein whereby weeds may be removed from hard soils and from unplowed fields in an efficient manner.

A further object of the invention is to provide a rod weeder assemblage containing said plows which may be assembled with rod weeder machines of the conventional type now in use or may be used in combination with the herein specifically described machine.

A still further object of the invention is to provide instrumentalities by the use of which it is unnecessary to first plow up hard soils by means of a separate operation for eradicating weeds as heretofore practiced.

Another object of the invention is to provide a device for treating a field of stubble by causing the latter together with debris to be removed from the soil of said field and be deposited on top of the surface of said soil for preventing erosion thereof such as is occasioned by high wind velocities; a washing away of said soil resultant from heavy falls of rain and the like, said deposit of stubble being spread evenly over said field for providing humus.

Other and further objects and advantages of the invention will be understood from the following detailed description thereof, reference being had to the accompanying drawing in which:

Figure 1 is a longitudinal vertical section taken on line 1—1 of Figure 2 and depicting a rod weeder machine which includes an embodiment of the present invention.

Figure 2 is a top plan view thereof, certain portions of said machine being broken away and other portions showing in section.

Figure 3 is a side elevation of a new shovel plow combined with a weeder rod, a supporting bar and adjacent parts, the latter being broken away, said bar and rod showing in section.

Figure 4 is a top plan view of the parts shown in Figure 3, said adjacent parts showing in section.

Figure 5 shows the rotary rod bearing made integral with the plow shovel.

As heretofore practiced in the art, rod weeders have been used in removing weeds from fields which have been plowed or from fields the soil of which is very loose or sandy and heretofore before a rod weeder could be used in soil which is of clay composition, hard or of a compacted character, it has been necessary to first plow up such field by means of a separate operation and before rod weeders of the prior art could be utilized, and the present invention aims to obviate the undesirable features of said prior practices.

Referring now to the drawing for a more particular description 10 generally indicates a frame having a front transversely disposed rail 11, a like rear rail 12, and oppositely disposed side rails 13. The forward rail 11 is supported upon bolsters 14, the latter being disposed at each side of said frame and provided with suitable apertures through which an elongated axle 15 extends whereby the forward end of said frame is pivotally carried on said axle.

Each end of the axle is provided with a wheel 16, one of which is splined thereto, said wheels being preferably disposed at each side of the frame 10.

Any suitable means is employed for attaching the machine to a tractor. Preferably and as best shown in Figure 1, vertically disposed bars 17 are secured at each side of the machine adjacent the forward end thereof, said bars each being provided with a row of vertically disposed apertures 18 for selectively receiving coupling bolts 19 for pivotally attaching a tongue 20 thereto, said bolts being disposed through selected apertures 18.

The tongue 20 is provided with an eye 21 for receiving a king bolt 22 for pivotally attaching a tow bar 23 thereto as outlined in Figure 1. The tow bar 23 is adapted to be pivotally connected to the towing step of a tractor for towing the machine forwardly and causing the forward wheels 16 and axle 15 to rotate while supporting the frame 10 from and above the surface 24 of the soil 25.

A plurality of spaced apart trailer-bars 26 are pivotally connected at their forward ends to the axle shaft 15, said bars being adapted to have vertical swinging movements. The rear end of each trailer bar is provided with an arm 27 pivotally mounted thereon for caster wheels 28 whereby said casters may swing or turn while in contact with said surface of the soil 25 and support said trailer-bars.

A toggle is provided for each trailer-bar 26.

Each toggle includes a lower link 29 and an upper link 30 which are pivotally joined together. The lower links 29 are pivotally attached to the trailer bars as at 31 and the upper links similarly attached as at 32 to the frame 10. A reach rod 33 is pivotally attached as at 34 to the links of each toggle. The forward ends of the rods 33 are pivotally connected as at 35 to the lower ends of levers 36.

The levers are pivotally mounted as at 37 on the frame 10, said levers being provided with grips 38 and toothed sectors 39 together with detents 40 whereby at times when the levers are moved in either direction the links of the toggles are correspondingly moved for elevating or lowering the frame 10 away from or towards the trailer-bars 26 and the surface 24 of the soil 25 for correspondingly causing certain later described plows to be embedded in said soil below said surface 24.

The axle shaft 15 is provided with a pinion 41 which is splined thereto and in constant mesh at all times with a similar pinion 42, the latter being suitably splined to a shaft 43. The shaft 43, as best shown in Figure 2, is mounted in a pillow block 44, the latter being secured to the frame 10.

A sprocket wheel 45 is provided and secured to the shaft 43. At times when the axle shaft 15 is revolved resultant from the wheels 16 being in contact with the soil during forward travel of the machine the sprocket 45 is correspondingly revolved for driving a sprocket chain 46 in the direction of the arrow 47.

The sprocket chain 46 drives a sprocket wheel 48, the latter being keyed to a transversely disposed shaft 49. The latter, as best shown in Figure 2, is disposed transversely above the frame 10.

Any desired number of beveled pinions 50 are axially secured to the shaft 49 in accordance with the transverse width of the machine. The pinions 50 are in constant mesh at all times with similar pinions 51. The pinions 51 are each secured to and drive a cleaner shaft 52. The shafts 52 are rectangular or square in cross section and each extend through a suitable elongated bearing 53 disposed adjacent their upper ends.

The upper ends of the bearings 53 are secured to the rear frame rail 12, the latter being disposed transversely between the side rails 13 of the frame 10. Extending downwardly from the rail 12 a plurality of standards 54 are provided for carrying a later described supporting bar for a weeder rod.

A standard 54 is provided rearwardly of and in parallelism with each cleaner shaft 52 whereby during forward travel of the machine and resultant from the cleaner shafts 52 rotating, weeds freed from the soil by a later described means are prevented from accumulating against the standards 54 during forward travel of the machine.

A U-shaped brace 55 is preferably employed for each standard 54, the upper ends of said braces being riveted to the heretofore mentioned rail 12 and the lower ends of said braces being riveted to the lower ends of the standards 54, as best shown in Figure 3.

The sprocket chain 46 also drives a sprocket wheel 56, the latter being splined to a shaft 57 which, as best shown in Figure 2, is journalled through a suitable bearing or pillow block 58, the latter being mounted on the rear end of a side rail of the frame 10. The shaft 57 when driven by the chain 46 drives a sprocket 59, the latter being secured to the shaft 57 for driving a sprocket chain 60. The sprocket chain 60 extends downwardly toward the soil 25 for rotating a weeder-rod. As best shown, in Figures 3 and 4, at the lower ends of the standards 54 a weeder-rod supporting bar 61 is disposed and secured to said standards by any suitable means, said bar 61 being transversely disposed with respect to said forward travel of the machine.

The bar 61 supports any desired number of spaced apart bearing eyes 62 each having a shank portion 63, said shanks being secured to the bar 61 by means of bolts. The eyes 62 provide a pivotal mounting for a weeder-rod 64, the latter being rectangular in cross section and preferably square in cross section.

As best shown in Figure 2, the sprocket chain 60 drives a sprocket wheel 65, the latter being rigidly secured to one end of the weeder-rod 64 for causing the latter to rotate at all times when the machine is being towed forwardly.

A suitable housing 66 is provided for enclosing the chain 60, pinion 65 and an end portion of the weeder-rod 64. That lower end of the housing 66 which engages in the soil is provided with a pointed and sharp lower end 67 for facilitating an entrance thereof into said soil. The housing prevents earth and debris from contact from the sprocket chain 60 and adjunct parts.

Plows are provided of a particular construction and shape for loosening the soil in advance of the weeder-rod 64. The plows are elongated and disposed longitudinally with respect to the machine and preferably a plow is provided for each bearing eye 62. Any suitable number of plows may be employed in accordance with soil conditions. For hard soils or soils which are in their natural state a greater number of plows are employed than for soils which are not compacted.

Each plow includes an elongated thin main body portion 68 having a pointed and sharp end 69 from which a mould board portion 70 inclinedly and divergently extends with respect to the main body portion 68 and rearwardly toward a bearing eye 62. The rearwardly disposed end 71 of the mould board 70 is disposed a sufficient distance away from the main body portion 68 for providing a space or notch within which the weeder-rod 64 and a bearing eye 62 may lie for protecting said bearing since the mould board 70 causes earth which is severed by the pointed end 69 to be turned upwardly of said eye, preventing a direct contact of soil with said bearing.

The rear end of said main body portion 68 is removably secured to the bar 61 by means of a suitable bolt 72 and between the mould board 70 and the main body portion 68 a reinforcing web portion 73 is preferably provided.

As thus described it will be noted that during forward travel of the machine driving power is derived from one of the forward wheels 16 thereof for rotating the weeder rod 64 in a direction whereby roots of weeds and the like severed by said weeder rod cause the stalks of said weeds to be moved upwardly and over the supporting bar 61, the cleaner shafts 52 preventing said stalks from lodging on the standards 54.

In operation and as shown in Figure 1 the sharp edges of the pointed ends 69 of the plows sever the soil during said forward travel of the machine and at a depth correspondingly with respect to a manipulation of the levers 36 whereby compacted soils may be weeded with a comparatively lesser amount of horse power than heretofore and at a proportional saving in cost. For soils which are sandy or of loose character the plows may be omitted. Also as thus described it will be understood that said plows may be separately sold and attached to the supporting bars for weeder rods of machines which are old in the art and that the herein specifically described supporting bars 61, bearing eyes 62, weeder rod 64 and plows may be assembled and sold for attachment to rod weeder machines heretofore and now in use by individual owners thereof.

Obviously, if desired, the bearing eyes 62 and plows may be formed integral for use in conjunction with certain rod weeder machines which are old in the art and for such machines the shank portion 63 of the eyes 62 are omitted. This structure is shown in Fig. 5.

From the foregoing description it is thought to be obvious that rod weeders constructed in accordance with my invention are particularly well adapted for use by reason of the convenience and facility with which they may be assembled and operated, and it will also be obvious that my invention is susceptible of some change and modification without departing from the principles and spirit thereof and for this reason I do not wish it to be understood as limiting myself to the precise arrangement and formation of the several parts herein shown in carrying out my invention in practice, except as claimed.

The principal subject matter herein disclosed is claimed in my copending application Serial No. 375,301 filed Jan. 21, 1941.

I claim:

In a machine for the purpose described, comprising an axle, a pair of oppositely disposed wheels secured to said axle, a frame having an end portion pivotally carried by said axle, means for connecting said end to a tractor for towing said frame forwardly and causing said wheels to rotate upon weed bearing soil for driving said axle, a plurality of spaced apart trailer-bars having forward ends pivotally secured to said axle, a caster-wheel for supporting the rear end of each trailer-bar, toggle-links pivotally secured to and disposed between said rear ends of each trailer-bar and the rear end of said frame, a plurality of standards having upper ends secured to said frame, a bar disposed transversely of said frame adjacent said soil and secured to the lower ends of said standards, a pivotally mounted weeder-rod disposed forwardly of said bar, a plurality of spaced apart plows secured to said bar having pointed ends disposed forwardly of said weeder-rod, a pivotally mounted cleaner-rod disposed forwardly of each standard, said weeder-rod and cleaner-rods being rectangular in cross section, means driven by said axle for causing said weeder-rod and cleaner-rods to rotate for respectively severing the roots of weeds from soil loosened by said plows and preventing the stalks of said weeds from lodging against said standards, means for operating each toggle for moving said rear end of said frame selectively away from or toward said soil, and detent means for holding said rear end of said frame in selected positions with respect to said soil for governing the depth of said plows and rod below the surface of said soil.

OSCAR E. MILLER.